March 1, 1955
C. F. GUNDERSON
2,703,391
SATURABLE REACTOR
Filed March 7, 1952
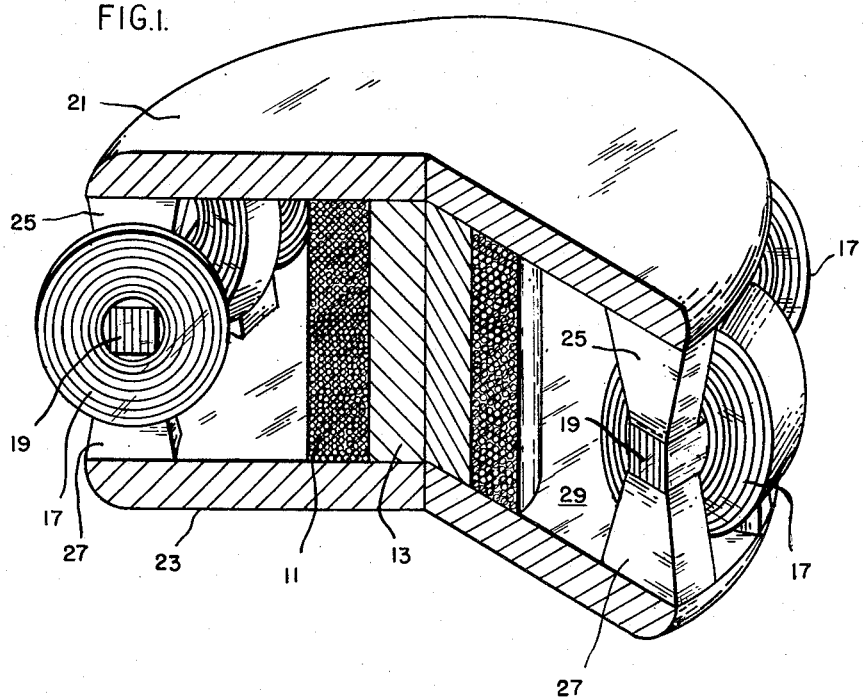
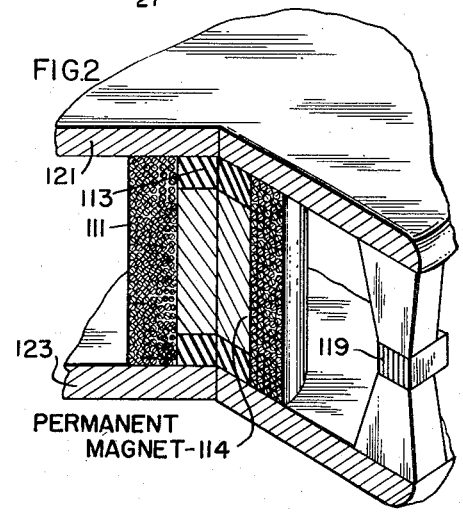
INVENTOR.
CHARLES F. GUNDERSON
BY
Harry M. Saragovitz
Attorney

United States Patent Office

2,703,391
Patented Mar. 1, 1955

2,703,391

SATURABLE REACTOR

Charles F. Gunderson, Belmar, N. J.

Application March 7, 1952, Serial No. 275,445

12 Claims. (Cl. 336—110)

(Granted under Title 35, U. S. Code (1952), sec. 266)

The invention described herein may be manufactured and used by or for the Government for governmental purposes, without the payment of any royalty thereon.

The subject invention is of a saturable reactor and more particularly of a saturable reactor having two coils with non-inductively interacting magnetic fields. Saturable reactors are widely known in the art, and consist of a coil whose inductance is varied by changing the degree of saturation of its magnetic core, the degre of saturation of the core usually being changed by varying the current in another coil whose magnetic flux path includes all or part of the magnetic flux path of the first coil. Thus, the current flowing in the second coil can affect the inductance in the first coil.

The saturable reactors generally known in the art consist of a direct current coil for controlling the degrees of saturation of a common core and two alternating current coils. The two alternating current coils are oriented in opposition to each other and are necessary to neutralize the total alternating current flux to avoid inducing an alternating current in the direct current control winding.

It is an object of this invention to provide a saturable reactor having only two coils.

It is a further object of this invention to mechanically orient the coils of saturable reactor so that the magnetic field of the alternating current coil will not induce a current in the direct current coil.

It is a further object of this invention to produce a saturable reactor of relative simple construction and ease of manufacture as well as of relatively light weight for the result produced.

It is a further object of this invention to provide a saturable reactor wherein at least a part of the direct current flux path contains no alternating current flux and the direct current flux path may include a permanent magnet.

It is a further object of this invention to provide a saturable reactor wherein a part of the direct current flux path can be of non-laminate structure.

Further objects of this invention will be apparent from the following specifications and claims.

The drawings represent preferred embodiments of this invention.

In Figure 1, the direct current coil 11 is wound around a center ferrous core 13 which may be of solid iron. The alternating current coils 17 are wound in segments around the toroidal core 19 which is positioned about core 13 as an axis. The toroidal core 19 can be laminated to reduce the hysteresis and eddy current losses due to the alternating current flux. The direct current flux path from the center of ferrous core 13 is lead across the top and bottom plates 21 and 23 thru the connecting teeth 25 and 27 and thru the laminations of the toroidal core 19. These laminations would be concentric in this case to reduce unnecessary air gaps in the direct current flux path. The alternating current and direct current flux paths cross at right angles, as shown, for example, at 29 where the ferrous teeth 25 and 27 carry the direct current flux thru the laminated core 19 in a direction parallel to the axis of core 13 while the alternating current flux of the coils 17 follows the toroidal path about the axis and perpendicular to it. A saturation of the laminated core 19 by the direct current flux will change the permeability of this toroidal core and the effective inductance of the coil 17. However, due to the orientation of the coils, there is no flux linkage between the turns of the coils 17 and 11 and there is no undesirable alternating current induced in the direct current control coil.

A study of the art shows that the saturation of an iron core in one direction will change its magnetic properties in the other direction and that this has been applied to a saturable reactor as seen in the patent to Burgess 743,444 issued November 10, 1903. In this device, one coil is encased in ferrous material and the second coil is wound toroidal about the ferrous material. However, this disclosure does not anticipate applicant's invention where the direct current flux path is in a relatively simple mechanical form and can be comparatively easily and cheaply manufactured. For example, the whole direct current path can be of cast iron or other solid ferrous material and only the toroidal, alternating core need be laminated. Furthermore, applicant's physical structure will permit the use of a permanent magnet in the core 13 to provide a standing flux concentration. This is shown in Figure 2, wherein the center ferrous core 113 is supplemented by the permanent magnet 114, whose poles are in series with the core 113 to provide a permanent flux through the plates 121 and 123. This would improve the effectiveness of the saturable reactor by reducing the amount of static, direct current required to bring the flux saturation in the alternating current path up to the point in its saturation curve where it becomes effective as a saturable reactor. This reduction in static current would increase the efficiency of the reactor by reducing "copper" losses, or heat loss.

The permanent magnet would presumably cooperate with the direct current coil 111 to provide enough flux to increase or decrease the saturation of the alternating current core 119 thru the effective portion of the saturation curve.

Since the permanent magnet could be made strong enough to actually saturate the alternating current core and the flux can be varied by well known mechanical means such as are seen in variable reluctance devices, the direct current control can be replaced by mechanical control for certain applications.

What is claimed is:

1. In a saturable reactor, a first coil of wire wound about a first axis, a toroidal magnetic core positioned outside of said first coil of wire concentric to said axis, a second coil of wire wound toroidally about said toroidal core, a ferrous core coaxial to and positioned within said first coil and ferrous material joining the ends of said ferrous core to opposing sides of said toroidal core providing a magnetic flux path for said first coil thru said toroidal core.

2. In a saturable reactor as in claim 1, said ferrous core of said first coil including a permanent magnet having opposing polar extremities directed towards the ends of said ferrous core.

3. In a saturable reactor, a direct current coil wound about a first ferrous core having opposing ends, an alternating current coil toroidally wound about a second saturable ferrous core, having opposing sides concentric to the axis of said first core, ferrous members joining the opposing ends of said first core to said opposing sides of said second core.

4. A saturable reactor, as in claim 3, wherein said second core comprises concentric laminations.

5. A saturable reactor, as in claim 3, wherein said second core comprising cylindrical, concentric laminations lying in substantially the same plane.

6. A saturable reactor, as in claim 3, wherein said ferrous members comprise: a first ferrous cap connecting one end of said first ferrous core to one side of said second core, and a second ferrous cap connecting the other end of said first core to the other side of said second core.

7. A saturable reactor as in claim 3, wherein said second saturable ferrous core comprises concentric laminations stacked with butt edges forming surfaces substantially perpendicular to said laminations, said surfaces providing said opposing sides: a first ferrous cap connecting one end of said first ferrous core to the butt edges of the laminations on one side of said second core and a second ferrous cap connecting the other end of said first core to the butt edges of the other side of the laminations of said second core.

8. In a saturable reactor as in claim 7, said ferrous caps comprising ferrous teeth joining said first core to sections uniformly spaced along said second core.

9. In a saturable reactor as in claim 8, said teeth on one side of said second ferrous core opposing the teeth on the other side of said second ferrous core.

10. In a saturable reactor as in claim 8, said teeth on one side of said second ferrous core positioned alternately to the teeth on the other side of said second ferrous core.

11. In a saturable reactor, a first coil of wire wound concentric to a first axis, a ferrous toroidal core having opposing sides concentric to said axis and outside of said first coil, a second coil of wire wound toroidally about said toroidal core, a ferrous core inside said first coil having opposing ends normal to said first axis and ferrous material joining said opposing ends of said ferrous core to said opposing sides of said toroidal core providing a magnetic flux path for said first coil across said toroidal core.

12. A saturable reactor comprising; a cylindrical permanent magnet having opposing ends at the poles of said magnet, a toroidal magnetic core having opposing faces concentric to said magnet, a first coil wound toroidally about said toroidal core, ferrous members connecting the poles of said magnet to said opposing faces of said toroidal core and a second coil wound about said magnet.

References Cited in the file of this patent

UNITED STATES PATENTS

| 2,200,263 | Kramolin | May 14, 1940 |
| 2,479,656 | Wiegand | Aug. 23, 1949 |

FOREIGN PATENTS

| 956,078 | France | Jan. 24, 1950 |